United States Patent [19]

Offenbroich

[11] Patent Number: 5,624,201
[45] Date of Patent: Apr. 29, 1997

[54] CLAMPING DEVICE

[76] Inventor: Adrian Offenbroich, Pionierstrasse 46, D-40215, Düsseldorf, Germany

[21] Appl. No.: 505,306

[22] PCT Filed: Dec. 10, 1993

[86] PCT No.: PCT/EP93/03497

§ 371 Date: Sep. 22, 1995

§ 102(e) Date: Sep. 22, 1995

[87] PCT Pub. No.: WO95/16138

PCT Pub. Date: Jun. 15, 1995

[51] Int. Cl.⁶ ................................................. F16B 9/00
[52] U.S. Cl. ...................... 403/231; 403/256; 403/257; 403/362; 403/409.1
[58] Field of Search ........................ 403/231, 256, 403/257, 362, 409.1

[56] References Cited

U.S. PATENT DOCUMENTS

| | | | |
|---|---|---|---|
| 3,537,736 | 11/1970 | Kroopp | 403/171 |
| 3,672,710 | 6/1972 | Kroopp | 403/256 X |
| 4,893,959 | 1/1990 | Offenbroich | 403/231 X |
| 5,209,598 | 5/1993 | Züllig | 403/231 X |

FOREIGN PATENT DOCUMENTS

| | | |
|---|---|---|
| 0000525 | 2/1979 | European Pat. Off. . |
| 0336915 | 10/1989 | European Pat. Off. . |
| 0371153 | 6/1990 | European Pat. Off. . |
| 0577976 | 6/1993 | European Pat. Off. . |
| 2137405 | 12/1972 | France . |
| 2337828 | 8/1977 | France . |
| 2484567 | 12/1981 | France . |
| 2599096 | 11/1987 | France . |
| 1675649 | 9/1969 | Germany . |
| 7237601 | 10/1972 | Germany . |
| 2603228 | 1/1977 | Germany . |
| 2812502 | 9/1979 | Germany . |
| 8023586 | 9/1980 | Germany . |
| 2941008 | 11/1980 | Germany . |
| 581274 | 10/1976 | Switzerland . |
| 2049093 | 12/1980 | United Kingdom . |

*Primary Examiner*—Brian K. Green
*Assistant Examiner*—Andrea Chop
*Attorney, Agent, or Firm*—Robert W. Becker & Associates

[57] ABSTRACT

A clamping device for releasably connecting two profile pieces, wherein the first profile piece has an undercut longitudinal groove and the second profile piece has a box-shaped hollow profile, has a clamping piece inserted into the second profile piece. The clamping piece has a hook-shaped head piece and a hammer head for engaging the longitudinal groove of the first profile piece. The hammer head is connected to a free end face of the head piece. The head piece has an inner sidewall with a slanted surface. The slanted surface extends perpendicular to a longitudinal axis of the clamping piece. The clamping piece includes a flat drawing piece. The head piece and the drawing piece are displaceable relative to one another in the longitudinal direction of the clamping piece. A clamping screw or an eccentric cooperating with the slanted surface is inserted in the drawing piece and is accessible through an opening in the second profile piece. Tightening of the clamping screw displaces the drawing piece relative to the head piece such that the hammer head is fastened in the longitudinal groove. The clamping piece also has an elastic loop bent around at least 180° and connected between head piece and drawing piece. The clamping piece, including head piece, hammer head, drawing piece, and elastic loop, is a unitary part. The elasticity of the elastic loop is sufficient to disengage the head piece with the hammer head upon releasing the clamping screw or eccentric.

13 Claims, 1 Drawing Sheet

5,624,201

CLAMPING DEVICE

BACKGROUND OF THE INVENTION

The subject matter of the invention is firstly a clamping device for the releasable connection of two profile pieces one of which has an undercut longitudinal groove and the other has a box-shaped hollow profile into which a clamping piece having a hammer head which engages the longitudinal groove and engages behind lips which delimit the longitudinal groove is inserted, the clamping piece having a dimensionally stable, hook-shaped head piece, on which end face the hammer head is fastened and whose inner side has a slanted surface which extends transversely with respect to the longitudinal axis of the clamping piece and with which a clamping screw with a conical tip cooperates, the screw being accessible through an opening in the hollow profile, and wherein the box-shaped hollow profile furthermore receives a flat drawing piece, with respect to which the head piece can be displaced in parallel counter to a spring force and into which the clamping screw is inserted in the direction of the slanted surface.

The subject matter of the invention is furthermore a clamping device for the releasable connection of two profile pieces one of which has an undercut longitudinal groove and the other has a box-shaped hollow profile into which a clamping piece having a hammer head which engages the longitudinal groove and engages behind lips which delimit the longitudinal groove is inserted, the clamping piece having a dimensionally stable, hook-shaped head piece, on whose end face the hammer head is fastened and which has a shoulder extruding transversely with respect to the longitudinal axis of the clamping piece with which an eccentric interacts, the eccentric accessible through an opening in the hollow profile, and wherein the box-shaped hollow profile furthermore receives a flat drawing piece, with respect to which the head piece can be displaced in parallel counter to a spring force and into which the eccentric is inserted in the direction of the slanted surface.

A clamping device of this type is known from U.S. Pat. No. 3,537,736. It is of a relatively complicated construction and comprises an insert piece receiving the clamping screw, a sliding piece with integrally molded hammer head, which is movable axially with respect to the insert piece, the clamping screw, and a spring which supports the insert piece relative to the sliding piece.

A clamping device which likewise comprises an insert piece, a bolt with the integrally formed hammer head, a clamping screw, and a spring, that is to say altogether four constructional parts, is known from DE-A-26 03 228. Clamping devices using this principle of construction have the disadvantage that the bolt is tilted when the clamping screw is screwed in, with the result that the hammer head preferably bears with only one side on the other profile piece.

A clamping device for the releasable connection of two profile pieces is furthermore known from DE-PS-29 41 008, which device operates with a leaf spring which engages at the front end with oppositely oriented hooks the longitudinal grooves of the other profile piece and is tensioned using an eccentric. This clamping device has the disadvantage that the lips of the longitudinal groove in the other profile piece can be damaged if the eccentric is pre-tensioned too strongly.

Based on this, the invention has the object of providing a simply constructed clamping device which is composed of as few individual parts as possible.

SUMMARY OF THE INVENTION

A clamping device for releasably connecting two profile pieces, wherein a first one of the profile pieces has an undercut longitudinal groove delimited by lips and a second one of the profile pieces has a box-shaped hollow profile, according to the present invention is primarily characterized by:

a clamping piece inserted into the second profile piece;
the clamping piece comprising a dimensionally stable, hook-shaped head piece and a hammer head for engaging the longitudinal groove of the first profile piece by engaging behind the lips, the hammer head connected to a free end face of the head piece;
the head piece having an inner sidewall with a slanted surface remote form the hammer head, the slanted surface extending perpendicular to a longitudinal axis of the clamping piece;
the clamping piece further comprising a flat drawing piece;
the head piece and the drawing piece displaceable relative to one another in the longitudinal direction of the clamping piece;
a clamping screw having a conical tip cooperating with the slanted surface, the clamping screw inserted in the drawing piece so as to be accessible through an opening in the second profile piece, wherein tightening of the clamping screw causes displacement of the drawing piece relative to the head piece such that the hammer head is fastened in the longitudinal groove;
the clamping piece further comprising an elastic loop bent around at least 180° and connected between the head piece and the drawing piece;
wherein clamping piece, comprised of the head piece, the hammer head, the drawing piece, and the elastic loop, is a unitary part; and
wherein the elasticity of the elastic loop is sufficient to disengage the head piece with the hammer head upon releasing the clamping screw.

Preferably, the drawing piece has a collar connected to an outer side thereof, the collar surrounding the clamping screw and engaging the opening of the second profile piece.

The head piece and the drawing piece expediently are spaced from or another in an area between the hammer head and the clamping screw at distance of a clamping path.

The drawing piece has preferably a crimped portion engaging beneath the head piece.

The clamping device preferably further comprises a bushing for receiving the clamping screw, the bushing inserted into the drawing piece.

The bushing projects into the opening of the second profile piece.

A portion of the elastic loop adjacent to the head piece is wave-shaped.

The clamping device expediently further comprises a steel bolt inserted into the slanted surface and the clamping screw cooperates with the steel bolt.

The present invention also relates to a second clamping device for releasably connecting two profile pieces, wherein a first one of the profile pieces has an undercut longitudinal groove delimited by lips and a second one of the profile pieces has a box-shaped hollow profile, which clamping device is primarily characterized by:

a clamping piece inserted into the second profile piece;
the clamping piece comprising a dimensionally stable, hook-shaped head piece and a hammer head for engaging the longitudinal groove of the first profile piece by engaging behind the lips, the hammer head connected to a free end face of the head piece;

the head piece having a shoulder remote form the hammer head, the shoulder extending perpendicular to a longitudinal axis of the clamping piece;

the clamping piece further comprising a flat drawing piece;

the head piece and the drawing piece displaceable relative to one another in the longitudinal direction of the clamping piece;

an eccentric cooperating with the shoulder, the eccentric inserted in the drawing piece so as to be accessible through an opening in the second profile piece, wherein tightening of the eccentric causes displacement of the drawing piece relative to the head piece such that the hammer head is fastened in the longitudinal groove;

the clamping piece further comprising an elastic loop bent around at least 180° and connected between the head piece and the drawing piece;

wherein clamping piece, comprised of the head piece, the hammer head, the drawing piece, and the elastic loop, is a unitary part; and wherein the elasticity of the elastic loop is sufficient to disengage the head piece with the hammer head upon releasing the eccentric.

The drawing piece preferably has a collar connected to an outer side thereof, the collar surrounding the eccentric and engaging the opening of the second profile piece.

The head piece and the drawing piece are spaced from one another in an area between the hammer head and the eccentric at a distance of a clamping path.

The drawing piece has a crimped portion engaging beneath the head piece.

A portion of the elastic loop adjacent to the head piece is wave-shaped.

With regard to the first mentioned technical subject matter the solution is characterized in that the clamping piece is designed in one part and comprises the head piece, the drawing piece, and a resilient loop which connects the head piece and drawing piece, is bent through at least 180°, and has an elasticity sufficient to disengage the head piece with the hammer head when the clamping screw is released.

With regard to the second mentioned technical subject matter the solution is characterized in that the clamping piece is designed in one part and comprises the head piece, the drawing piece, and a resilient loop which connects the head piece and drawing piece, is bent through at least 180°, and has an elasticity sufficient to disengage the head piece with the hammer head when the eccentric is released.

In a practical embodiment of both technical solutions, the drawing piece can engage the opening of the hollow profile by means of a collar which extends on the outer side of the drawing piece around the clamping screw or the eccentric, in order to provide a counter bearing in the hollow profile.

In a further embodiment of the invention, the head piece and the drawing piece can be separated from one another between the hammer head and the clamping screw or the eccentric by the distance of a clamping path S, which is somewhat greater than the maximum clamping path of the hammer head.

To relieve the hollow profile from pressure stresses which originate at the clamping piece, it is further proposed to provide the drawing piece at the front end with a crimped portion which engages beneath the head piece. As a result, the tensile and pressure forces which are produced in the clamping piece during clamping are eliminated in the clamping piece itself.

In a further embodiment of the invention, a bushing for receiving the clamping screw or the eccentric can be inserted into the drawing piece. In this case the bushing, instead of the drawing piece, projects into the opening of the hollow profile.

To improve the elasticity, the beginning of the loop extending from the head piece can be bent in the form of a wave.

To improve the transmission of force between clamping screw or eccentric and slanted surface, a steel bolt or a steel shoulder can be inserted into the slanted surface.

A clamping device designed in accordance with the invention has the advantage that, in principle, it comprises only two individual constructional parts, namely the clamping piece and the screw or the eccentric, which can be handled easily. In both embodiments the hammer head with the head piece is drawn parallel to the hollow profile, so that the lips of the other profile piece are also loaded uniformly with the pressure surfaces of the hammer head.

BRIEF DESCRIPTION OF THE DRAWINGS

Further details and advantages emerge from the following description of the associated drawings, in which two different exemplary embodiments having a clamping screw are shown. In the drawings.

DESCRIPTION OF PREFERRED EMBODIMENTS

Figure 1:
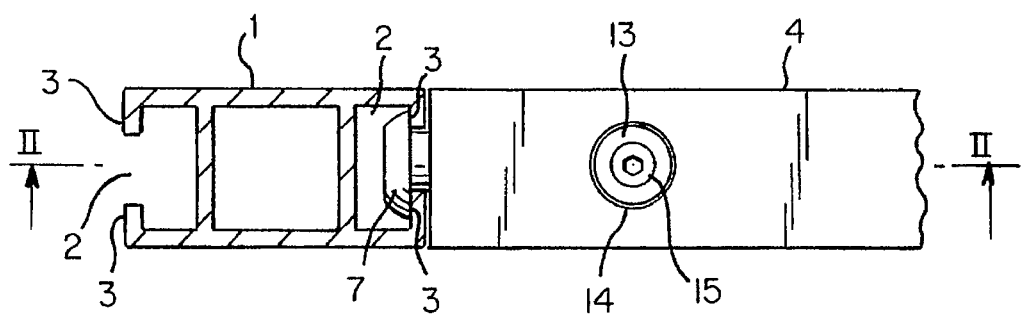
FIG. 1 shows a clamping device in top view.
Figure 2:
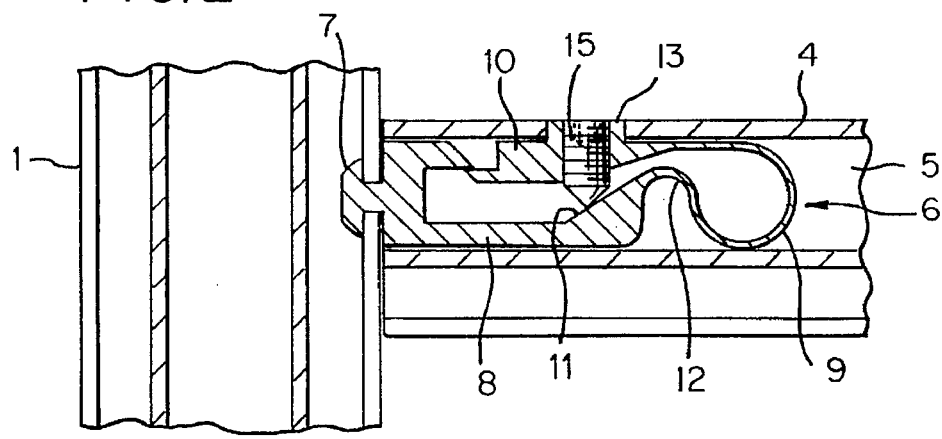
FIG. 2 shows the same clamping device in sectional sideview along the line II—II in FIG. 1.

Arranged in a first profile piece 1 is an undercut longitudinal groove 2 which is delimited by lips 3. Connected to the profile piece 1 is a second profile piece 4 which has a hollow profile 5.

In the hollow profile 5 there is a clamping piece 6 which engages with a hammer head 7 the longitudinal groove 2 and engages behind both its lips 3.

The clamping piece 6 comprises a hook-shaped head piece 8, an elastically resilient loop 9, and a drawing piece 10 which are connected to one another continuously. The hammer head 7 is secured to the end face of the head piece 8. Formed on the inner side of the head piece 8 is a slanted surface 11 which merges via a wave portion 12 into the elastic loop 9. Provided on the drawing piece 10 is a collar 13 which is supported in an opening 14 of the profile piece 4. Arranged concentrically with respect to the collar 13 is a clamping screw 15 which engages the slanted surface 11 with a cone.

Between the inwardly-directed end of the head piece 8 and the outwardly-directed end of the drawing piece 10 there is provided a clamping path S which is somewhat greater than the movement play of the hammer head 7 in the longitudinal groove 2.

Figure 3:
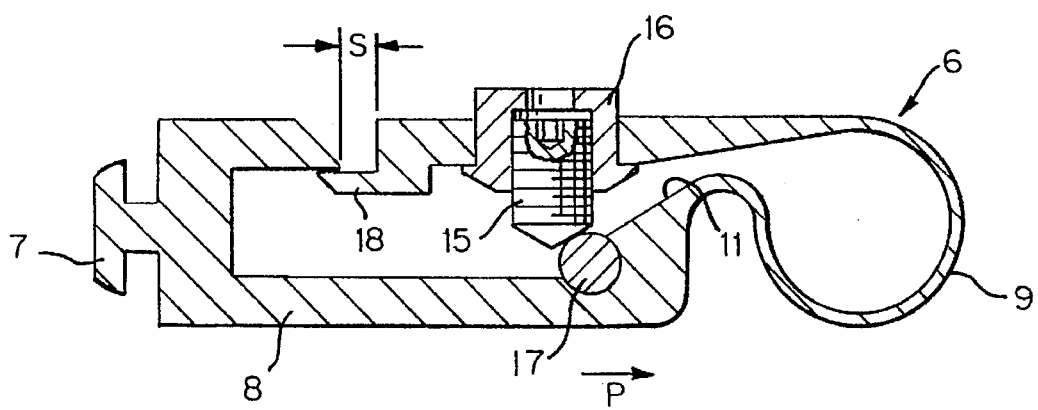
FIG. 3 shows an enlarged representation of a clamping piece with clamping screw, without the two profile pieces, in a longitudinal section.

In the exemplary embodiment according to FIG. 3, a bushing 16 is inserted into the drawing piece 10 and receives the clamping screw 15. Moreover, a steel bolt 17, which interacts with the cone of the clamping screw 15, is inserted into the slanted surface 11.

The front end of the drawing piece 10 can be provided with a crimped portion 18, which engages under the inwardly-directed end of the head piece 8.

In order to be able to insert the clamping piece 6 into the hollow profile 5, the clamping screw 15 is first unscrewed or is unscrewed in the bushing 16 as far as the stop, in order that sufficient play is produced between the cone of the clamping screw 15 and the slanted surface 11 or the steel bolt 17 so as to be able to press the drawing piece 11 inwardly and lock the collar 13 or the bushing 16 in the opening 14. The profile piece 4 with the hammer head 7 is then inserted into the profile piece 1. When the clamping screw 15 is then screwed against the slanted surface 11 or the bolt 17, the head piece 8 is displaced in the direction of the arrow P, since the collar 13 or the bushing 16 are supported in the opening 14 of the profile piece 4. As soon as the clamping screw 15 is released, the internal elasticity of the loop 9 is sufficient to disengage the hammer head 7. After this, the two profile pieces 1, 4 can be released from each other.

The clamping piece 6, including the hammer head 7, is drawn as a profile and then cut off to a corresponding width. In the drawn profile, the free edges of the head piece 8 and of the drawing piece 10 are located at a small distance above each other. This is likewise the case in blanks cut off to a specific width in order to be able to snap the drawing piece 10 more easily into the head piece 8, the free edges are bevelled parallel to each other.

The present invention is, of course, in no way restricted to the specific disclosure of the specification and drawings, but also encompasses any modifications within the scope of the appended claims.

What I claim is:

1. A clamping device for releasably connecting two profile pieces, wherein a first one of the profile pieces has an undercut longitudinal groove delimited by lips and a second one of the profile pieces has a box-shaped hollow profile, said clamping device comprising:

a clamping piece for being inserted into the second profile piece;

said clamping piece comprising a dimensionally stable, hook-shaped head piece and a hammer head for engaging the longitudinal groove of the first profile piece by engaging behind the lips, said hammer head connected to a free end face of said head piece;

said head piece having an inner sidewall with a slanted surface remote from said hammer head, said slanted surface extending at an angle to a longitudinal axis of said clamping piece;

said clamping piece further comprising a flat drawing piece;

said head piece and said drawing piece displaceable relative to one another in the longitudinal direction of said clamping piece;

a clamping screw having a conical tip cooperating with said slanted surface, said clamping screw inserted in said drawing piece so as to be accessible through an opening in the second profile piece, wherein tightening of said clamping screw causes displacement of said drawing piece relative to said head piece such that said hammer head is able to be fastened in said longitudinal groove;

said clamping piece further comprising an elastic loop bent around at least 180° and connected between said head piece and said drawing piece;

wherein said clamping piece, comprised of said head piece, said hammer head, said drawing piece, and said elastic loop, is a unitary part; and wherein the elasticity of said elastic loop is sufficient to disengage said head piece with said hammer head upon releasing said clamping screw.

2. A clamping device according to claim 1, wherein said drawing piece has a collar connected to an outer side thereof, said collar surrounding said clamping screw for engaging the opening of the second profile piece.

3. A clamping device according to claim 1, wherein said head piece and said drawing piece are spaced from one another in an area between said hammer head and said clamping screw at a distance of a clamping path.

4. A clamping device according to claim 1, wherein said drawing piece has a crimped portion engaging beneath said head piece.

5. A clamping device according to claim 1, further comprising a bushing for receiving said clamping screw, said bushing inserted into said drawing piece.

6. A clamping device according to claim 5, wherein said bushing is projectable into the opening of the second profile piece.

7. A clamping device according to claim 1, wherein a portion of said elastic loop adjacent to said head piece is wave-shaped.

8. A clamping device according to claim 1, further comprising a steel bolt inserted into said slanted surface and wherein said clamping screw cooperates with said steel bolt.

9. A clamping device for releasably connecting two profile pieces, wherein a first one of the profile pieces has an undercut longitudinal groove delimited by lips and a second one of the profile pieces has a box-shaped hollow profile, said clamping device comprising:

a clamping piece for being inserted into the second profile piece;

said clamping piece comprising a dimensionally stable, hook-shaped head piece and a hammer head for engaging the longitudinal groove of the first profile piece by engaging behind the lips, said hammer head connected to a free end face of said head piece;

said head piece having a shoulder remote from said hammer head, said shoulder extending at an angle to a longitudinal axis of said clamping piece;

said clamping piece further comprising a flat drawing piece;

said head piece and said drawing piece displaceable relative to one another in the longitudinal direction of said clamping piece;

an eccentric cooperating with said shoulder, said eccentric inserted in said drawing piece so as to be accessible through an opening in the second profile piece, wherein tightening of said eccentric causes displacement of said drawing piece relative to said head piece such that said hammer head is able to be fastened in said longitudinal groove;

said clamping piece further comprising an elastic loop bent around at least 180° and connected between said head piece and said drawing piece;

wherein said clamping piece, comprised of said head piece, said hammer head, said drawing piece, and said elastic loop, is a unitary part; and wherein the elasticity of said elastic loop is sufficient to disengage said head piece with said hammer head upon releasing said eccentric.

10. A clamping device according to claim 9, wherein said drawing piece has a collar connected to an outer side thereof, said collar surrounding said eccentric for engaging the opening of the second profile piece.

11. A clamping device according to claim 9, wherein said head piece and said drawing piece are spaced from one another in an area between said hammer head and said eccentric at a distance of a clamping path.

12. A clamping device according to claim 9, wherein said drawing piece has a crimped portion engaging beneath said head piece.

13. A clamping device according to claim 9, wherein a portion of said elastic loop adjacent to said head piece is wave-shaped.

* * * * *